(12) United States Patent
Hu et al.

(10) Patent No.: US 9,350,232 B2
(45) Date of Patent: May 24, 2016

(54) POWER SUPPLY WITH CONTINUOUS SPREAD-SPECTRUM SWITCHING SIGNAL

(71) Applicant: Apple Inc., Cupertino, CA (US)

(72) Inventors: Yongxuan Hu, Cupertino, CA (US); Keong W. Kam, Santa Clara, CA (US); Shimon Elkayam, San Jose, CA (US); Susan R. Schen, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 356 days.

(21) Appl. No.: 13/854,805

(22) Filed: Apr. 1, 2013

(65) Prior Publication Data

US 2014/0268900 A1 Sep. 18, 2014

Related U.S. Application Data

(60) Provisional application No. 61/786,222, filed on Mar. 14, 2013.

(51) Int. Cl.
  *H02M 3/338* (2006.01)
  *H02M 1/44* (2007.01)
  *H02M 3/158* (2006.01)
  *H02M 3/335* (2006.01)

(52) U.S. Cl.
  CPC ............. *H02M 1/44* (2013.01); *H02M 3/158* (2013.01); *H02M 3/33507* (2013.01)

(58) Field of Classification Search
  CPC ..... H02M 3/156; H02M 3/158; H02M 3/338; H02M 3/3381; H02M 3/3385; H02M 1/44; Y02B 70/126
  USPC .................... 323/222, 282; 363/18
  See application file for complete search history.

(56) References Cited

U.S. PATENT DOCUMENTS 5,459,392 A * 10/1995 Mandelcorn .................. 323/222
7,227,652 B2 * 6/2007 Cronch et al. ............... 358/1.14
7,362,191 B2 * 4/2008 Chen et al. ...................... 331/78

OTHER PUBLICATIONS

Spread Spectrum Techniques to Reduce EMI in SMPS Devices Prepared by Matthew Majelka; Semiconductor Components Industries, LLC, 2009, Nov. 2009—Rev. 0; Publication Order Number. AND8428/D.
Analysis and Spectral Characteristics of a Spread-Spectrum Technique for Conducted EMI Suppression, K.K. Ese, Member, Henry Shu-Hung Chung, Member, IEEE., S.Y. (Ron) Hui, Senior Member, IEEE., and H.C. So, Member, IEEE, 0885-8993/00$10.00 2000 IEEE.
Understanding Noise-Spreading Techniques and Their Effects in Switch-Mode Power Applications, John Rice, Dirk Gehrke, and Mike Segal.

* cited by examiner

*Primary Examiner* — Yemane Mehari
(74) *Attorney, Agent, or Firm* — Blank Rome LLP (57) ABSTRACT

A switched-mode power supply with reduced electromagnetic interference (EMI) is described. This switched-mode power supply includes a modulation circuit that continuously frequency modulates a control signal over a bandwidth associated with a spread-spectrum modulation signal. By frequency modulating the control signal in the switched-mode power supply, spectral content associated with a modulated switching signal is spread evenly over the bandwidth, thereby reducing the EMI.

18 Claims, 8 Drawing Sheets

POWER SUPPLY WITH CONTINUOUS SPREAD-SPECTRUM SWITCHING SIGNAL

CROSS REFERENCE TO RELATED APPLICATION

This application claims priority under 35 U.S.C. §119(e) to U.S. Provisional Application Ser. No. 61/786,222, entitled "Power Supply with Continuous Spread-Spectrum Switching Signal," by Yongxuan Hu, Keong W. Kam, Shimon Elkayam, and Susan R. Schen, filed on Mar. 14, 2013, the contents of which is herein incorporated by reference.

BACKGROUND

1. Field

The described embodiments relate to techniques for controlling electromagnetic interference (EMI) associated with a power supply. More specifically, the described embodiments relate to techniques for reducing EMI by frequency modulating the switching signal used to drive a switched-mode power supply.

2. Related Art

Switched-mode power supplies (which are sometimes referred to as 'switching regulators') are widely used in electronic devices because they combine high power-conversion efficiency with smaller transformer size and weight. Like other types of power supplies, a switched-mode power supply transfers power from a source (such as an electrical power grid) to a load (such as an electronic device) while converting voltage and current characteristics. Typically, a switched-mode power supply provides a regulated output voltage, which is different than the input voltage.

In a switched-mode power supply, the output current or voltage is regulated by switching a storage element (such as an inductor or a capacitor) between electrical configurations using a switching element, such as a transistor. For example, a pass transistor in a switched-mode power supply may continually switch between low-dissipation, full-on and full-off states, and may spend very little time during the high-dissipation transitions, thereby minimizing the power consumption of the power supply. By varying the ratio of the on-to-off time, the output voltage may be regulated.

However, the switching currents associated with switched-mode power supplies can cause electrical noise. In particular, the switching typically generates high-amplitude, high-frequency energy. While some of this energy can be blocked using a low-pass filter, electromagnetic interference (EMI) can occur. This EMI can complicate the design of electronic devices that include switched-mode power supplies because of its impact on other components in the electronic devices and the increased difficulty in meeting EMI regulatory requirements.

SUMMARY

The described embodiments include a switched-mode power supply with: a control circuit that provides a control signal; a modulation circuit that provides a modulated switching signal by frequency modulating the control signal over a bandwidth using a spread-spectrum modulation signal so that spectral content associated with the modulated switching signal is spread over the bandwidth in the spread-spectrum modulation signal; and a power-supply circuit that performs power conversion based on the modulated switching signal to generate an output signal.

In some embodiments, the frequency modulation includes continuous frequency modulation over the bandwidth. For example, the spread-spectrum modulation signal may include an analog signal or a multiple-step discrete approximation to the analog signal (such as 1024 steps).

Moreover, the spectral content may be spread approximately evenly over the bandwidth. For example, the spread-spectrum modulation signal may include a triangle waveform.

Note that the output signal may be pulse-width modulated.

In some embodiments, the modulation circuit includes: a first oscillator; an amplifier that converts an output of the first oscillator into a current signal corresponding to the spread-spectrum modulation signal; and a second oscillator that provides the modulated switching signal.

Furthermore, the modulation circuit may reduce switching noise output by the switched-mode power supply.

Another embodiment provides an electronic device that includes the power supply.

Another embodiment provides a method for power conversion, which may be performed by the switched-mode power supply. During operation, the control circuit provides the control signal. Then, the modulation circuit modulates the control signal to obtain the modulated switching signal, where the modulating involves frequency modulating the control signal over the bandwidth using the spread-spectrum modulation signal so that spectral content associated with the modulated switching signal is spread over the bandwidth in the spread-spectrum modulation signal. Next, the power-supply circuit performs power conversion based on the modulated switching signal to generate an output signal.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
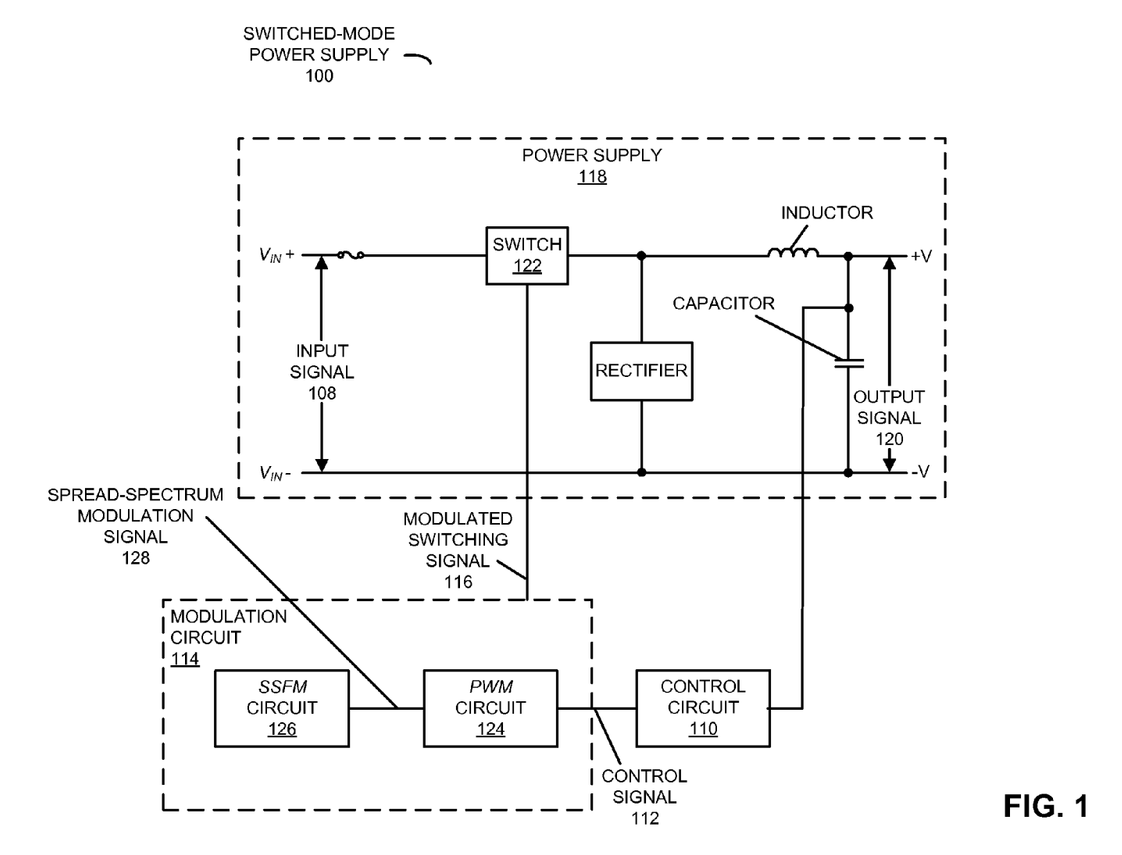
FIG. 1 is a block diagram illustrating a switched-mode power supply in accordance with an embodiment of the present disclosure.

FIG. 1 presents a block diagram illustrating a switched-mode power supply 100. This switched-mode power supply includes a control circuit 110 that provides a control signal 112. For example, control circuit 110 may include a differential amplifier and/or a compensation network.

Moreover, a modulation circuit 114 in switched-mode power supply 100, which includes a pulse-width modulation (PWM) circuit 124 and a spread-spectrum frequency-modulation (SSFM) circuit 126, provides a modulated switching signal 116 by frequency modulating control signal 112 over a bandwidth using a spread-spectrum modulation signal 128 (and, in particular, by pulse-width modulating control signal 112). In this way, spectral content associated with modulated switching signal 116 is spread over the bandwidth in spread-spectrum modulation signal 128.

As described below with reference to FIGS. 3 and 5, spread-spectrum frequency-modulation circuit 126 may include approximately continuous or continuous frequency modulation over the bandwidth. For example, spread-spectrum modulation signal 128 may include an analog signal (FIG. 6) or a multiple-step discrete approximation to the analog signal (FIG. 4), such as 1024 steps. Moreover, the spectral content may be spread approximately evenly over the bandwidth. For example, spread-spectrum modulation signal 128 may include a triangle waveform. However, a wide variety of spread-spectrum modulation signals may be used in switched-mode power supply 100, including: a sawtooth waveform, a harmonic waveform (such as a sine wave), a squarewave waveform or an arbitrary pattern.

While frequency modulation is used as an illustrative example in FIG. 1, a wide variety of modulation techniques may be used in switched-mode power supply 100, including amplitude modulation, frequency modulation and/or phase modulation.

Furthermore, power-supply circuit 118 in switched-mode power supply 100 performs power conversion based on modulated switching signal 116 to generate an output signal 120 (such as an output voltage). In particular, during operation of switched-mode power supply 100, input signal 108 from a source (such as an input voltage from a battery or a full-bridge rectifier or a half-bridge rectifier electrically coupled to household alternating current electricity provided by an electrical power grid) is electrically coupled in an alternating fashion by a switch 122 (such as a field-effect transistor or a FET) based on modulated switching signal 116. In this way, the peak voltage is coupled to an inductor to store energy, and then the inductor is discharged into a load (such as a computer system) by outputting output signal 120. This output signal may be pulse-width modulated.

Figure 2:
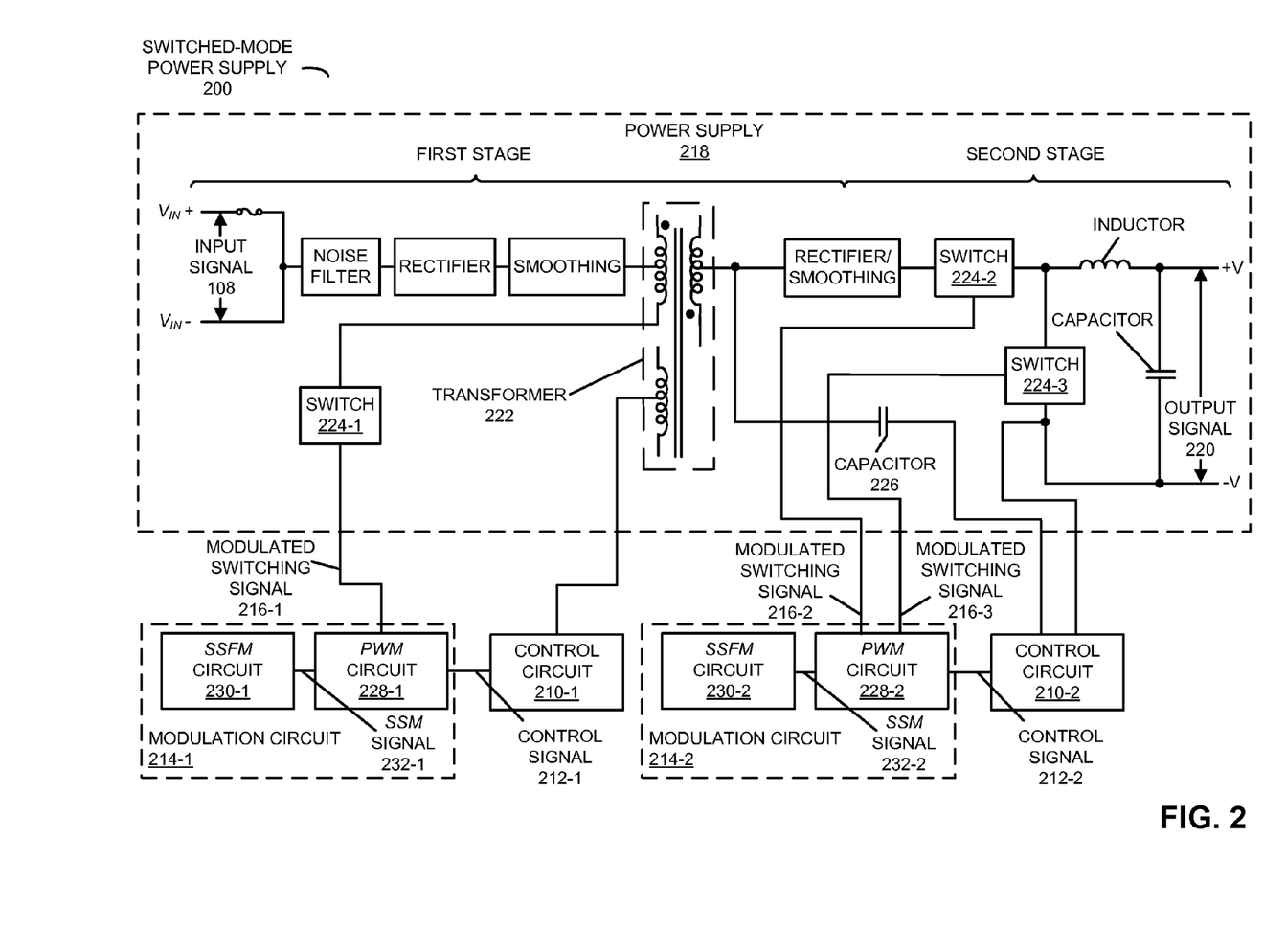
FIG. 2 is a block diagram illustrating a switched-mode power supply in accordance with an embodiment of the present disclosure.

While FIG. 1 illustrates a single-stage switched-mode power supply, in other embodiments the switched-mode power supply includes multiple stages. This is shown in FIG. 2, which presents a block diagram illustrating a switched-mode power supply 200. This switched-mode power supply includes one or more control circuits 210 that provide one or more control signals 212. For example, each instance of the one or more control circuits 210 may include a differential amplifier and/or a compensation network.

Moreover, one or more modulation circuits 214 in switched-mode power supply 200, which each include one of PWM circuits 228 and spread-spectrum frequency-modulation (SSFM) circuits 230, provide one or more modulated switching signals 216 by frequency modulating the one or more control signals 212 over the bandwidth using one or more spread-spectrum modulation (SSM) signals 232. In this way, spectral content associated with an instance of the one or more modulated switching signals 216 is spread over the bandwidth in an instance of the spread-spectrum modulation signals 232. As noted previously, the spectral content may be spread approximately evenly over the bandwidth.

While frequency modulation is used as an illustrative example in FIG. 2, a wide variety of modulation techniques may be used in switched-mode power supply 200, including amplitude modulation, frequency modulation and/or phase modulation.

Furthermore, power-supply circuit 218 in switched-mode power supply 200 performs power conversion based on the one or more modulated switching signals 216 to generate an output signal 220 (such as an output voltage). In particular, during operation of switched-mode power supply 200, input signal 108 from a source (such as a battery or a full-bridge rectifier or a half-bridge rectifier electrically coupled to household alternating current electricity provided by an electrical power grid) is electrically coupled to a first stage of switched-mode power supply 200 (and, thus, to the primary winding of transformer 222) in an alternating fashion by a switch 224-1 (such as a field-effect transistor or a FET) based on modulated switching signal 216-1. Then, a rectifier (such as a diode) and capacitor 226, which are in parallel with the secondary winding of transformer 222, store the peak voltage (and, more generally, energy) output by transformer 222 on capacitor 226.

The stored peak voltage is input to a second stage in power-supply circuit 218 (and, in particular, a step-down DC-to-DC converter). Based on modulated switching signals 216-2 and 216-3, switches 224-2 and 224-3 (such as FETs) alternately electrically couple the voltage on capacitor 226 in switched-mode power-supply circuit 200 to an inductor to store energy, and then discharge the inductor into a load (such as a computer system) by outputting output signal 220. In an exemplary embodiment, the voltage associated with output signal 220 is one of: 1 V, 1.8 V, 3.3 V, 5 V, 8 V, and 12 V.

Note that modulated switching signals 216-2 and 216-3 may be the same or different from modulated switching signal 216-1. For example, modulated switching signal 216-1, modulated switching signal 216-2 and modulated switching signal 216-3 may have the same fundamental frequency and different phases.

In an exemplary embodiment, the one or more control signals 212 and the one or more modulated switching signals 216 each may have a fundamental frequency of hundreds of kilohertz, and the bandwidth may be between several hundred and a few thousand hertz.

By frequency modulating the control signal so that the spectral content of the modulated switching signal is spread out over the bandwidth, switching noise and/or electromagnetic interference (EMI) associated with operation of switched-mode power supply 100 (FIG. 1) and switched-mode power supply 200 may be reduced.

We now further discuss embodiments of the spread-spectrum modulation technique. EMI is common in portable electronic devices. As the portable electronic device size is reduced, it becomes increasingly difficult to address EMI issues because of both the higher EMI levels and size constraints on EMI solutions.

One common noise source in the conducted emissions measured at the AC power line and telecom lines is switching noise (such as 400 kHz switching harmonics), which is associated with switching signals in switched-mode power supplies. In principle, a spread-spectrum modulation technique can be used to alleviate EMI associated with the switching signals in switched-mode power supplies by spreading the spectral content or energy associated with the switching signals over a wide spectrum, thereby lowering the peak spectral energy. For example, a fixed number of frequency points, e.g.

an $N^{th}$ power of 2 (such as 2 or 4), can be used to spread the spectral content. In particular, frequency modulation based on a spread-spectrum modulation signal can be implemented using a number of discrete steps. For some portable electronic devices, modulating the control signals using a spread-spectrum modulation signal having a small number of discrete steps (such as 2 or 4) is sufficient to address switching noise in EMI (and, thus, these portable electronic devices may pass an electromagnetic-compatibility test).

However, because the EMI level is increasing and the size constraints are becoming more stringent, modulating the control signals using a small number of discrete steps is often insufficient. In principle, this challenge can be addressed by increasing the magnitude of the spread-spectrum modulation signal (because the magnitude of the modulation determines the percentage spreading, which in turn results in overlap of adjacent modulated harmonics). This is because, as the number of discrete steps in the spread-spectrum modulation signal is increased, the peak magnitude of the modulated switching signal may be decreased. However, eventually, if the number of discrete steps in the spread-spectrum modulation signal is increased too much, the integrated circuit implementation becomes physically impractical because it requires a large number of matched current sources of 1s to 10s of nanoAmperes, and these current sources may need to operate in sub-threshold region because of the low current level, which may result in poor matching. Because of these reasons, in practice, only 4 or 8 discrete steps are used.

In the spread-spectrum modulation technique, a spread-spectrum modulation signal that evenly distributes the spectral energy over the bandwidth (such as a triangle waveform or a sawtooth waveform) provides reduced EMI. However, a squarewave waveform or a sine waveform may result in peaks in the spectrum associated with the modulated switching signal. In addition, a scrambled waveform (i.e., pseudorandom or random modulation) may result in poorer EMI performance.

Figure 3:
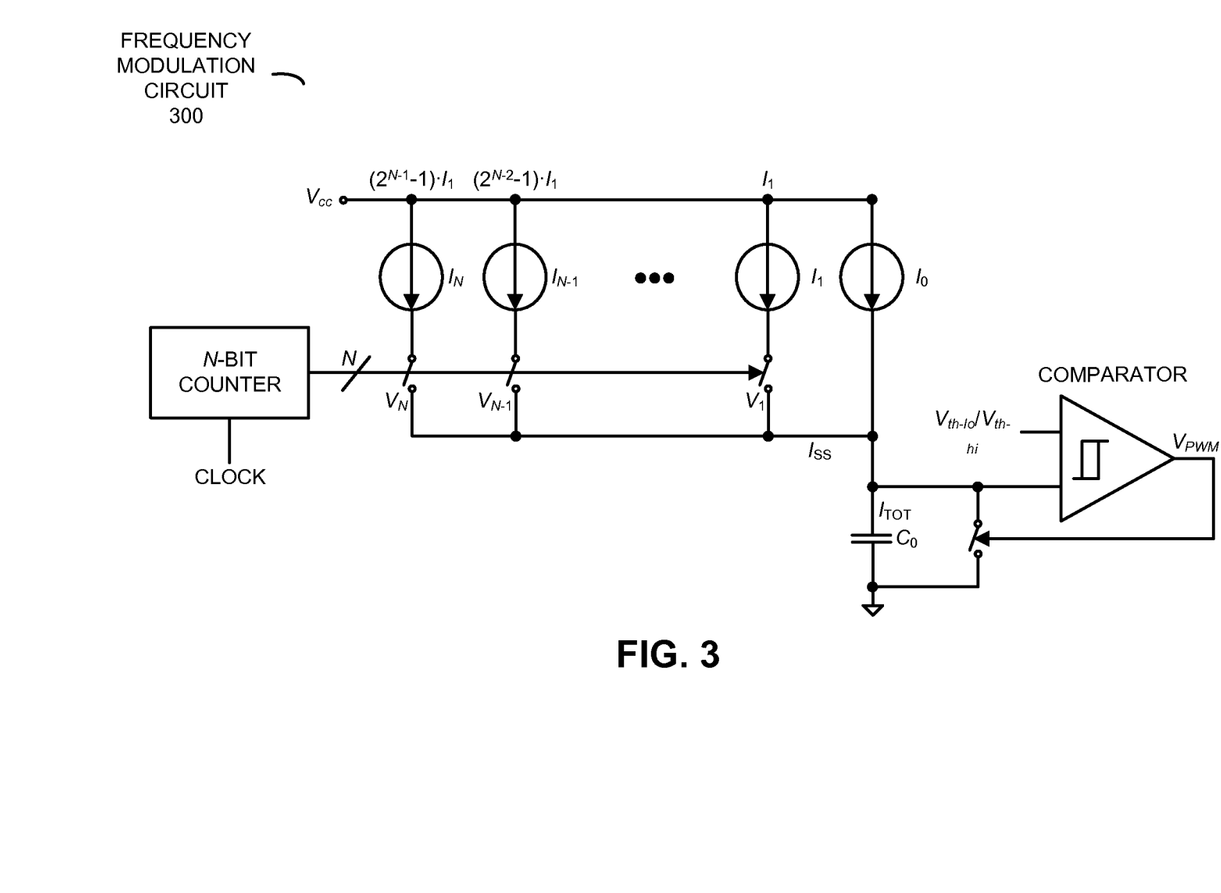
FIG. 3 is a block diagram illustrating a frequency modulation circuit in the switched-mode power supplies of FIGS. 1 and 2 in accordance with an embodiment of the present disclosure.

A frequency modulation circuit 300 with a binary-coded current source that implements a discrete approximation to the continuous spread-spectrum modulation is shown in FIG. 3. In frequency modulation circuit 300, current sources $I_1$ through $I_N$ are binary coded and an N-bit counter counts up (from 0 to $2^N-1$) and repeats based on a clock (with a clock frequency equal to $2^N \cdot f_{sweep}$). Therefore, $I_{SS}$ changes in steps of $I_1$ from $I_0$ to $I_0+(2^N-1) \cdot I_1$. Moreover, the output of the comparator, $V_{PWM}$ is a PWM squarewave with a fundamental frequency that changes between $f_1$ and $f_{2N}$ as specified by a sawtooth waveform defined by $I_{TOT}$. In principle, frequency modulation circuit 300 can be used to implement an arbitrary number of steps (such as an N of 1024). In practice, when N is greater than 2 or 3, $I_1$ is very small compared to $I_0$, which may make it harder to design frequency modulation circuit 300.

Figure 4:
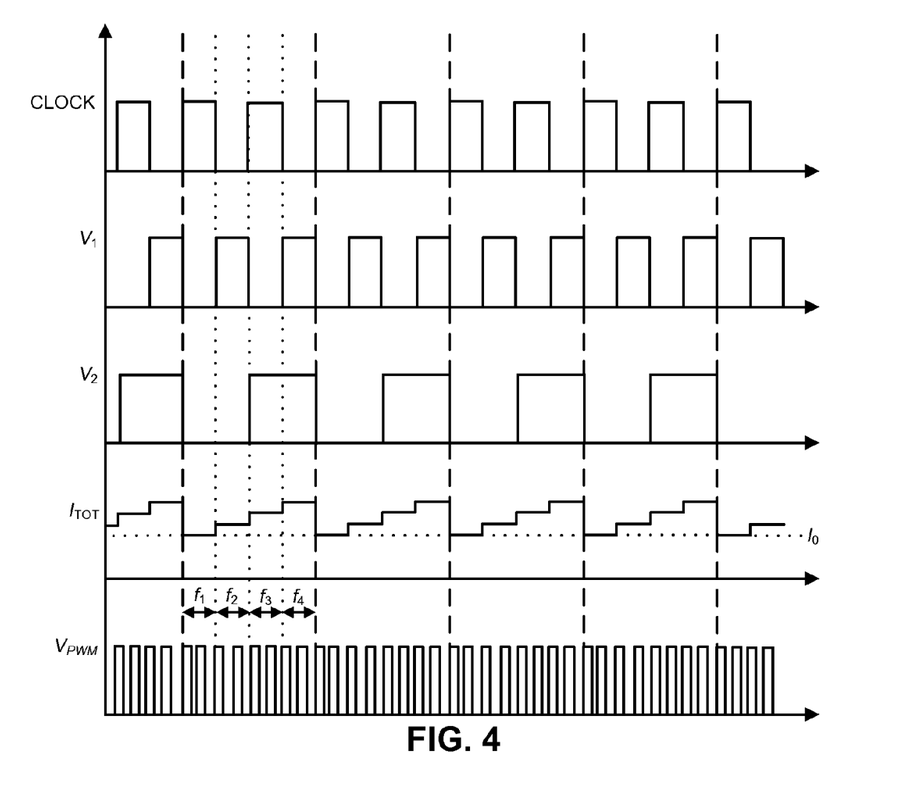
FIG. 4 is a timing diagram illustrating signals associated with the frequency modulation circuit of FIG. 3 in accordance with an embodiment of the present disclosure.

FIG. 4 presents a timing diagram illustrating signals associated with frequency modulation circuit 300 (FIG. 3) for spread-spectrum modulation based on a $2^2$ approximation to a sawtooth waveform.

Figure 5:
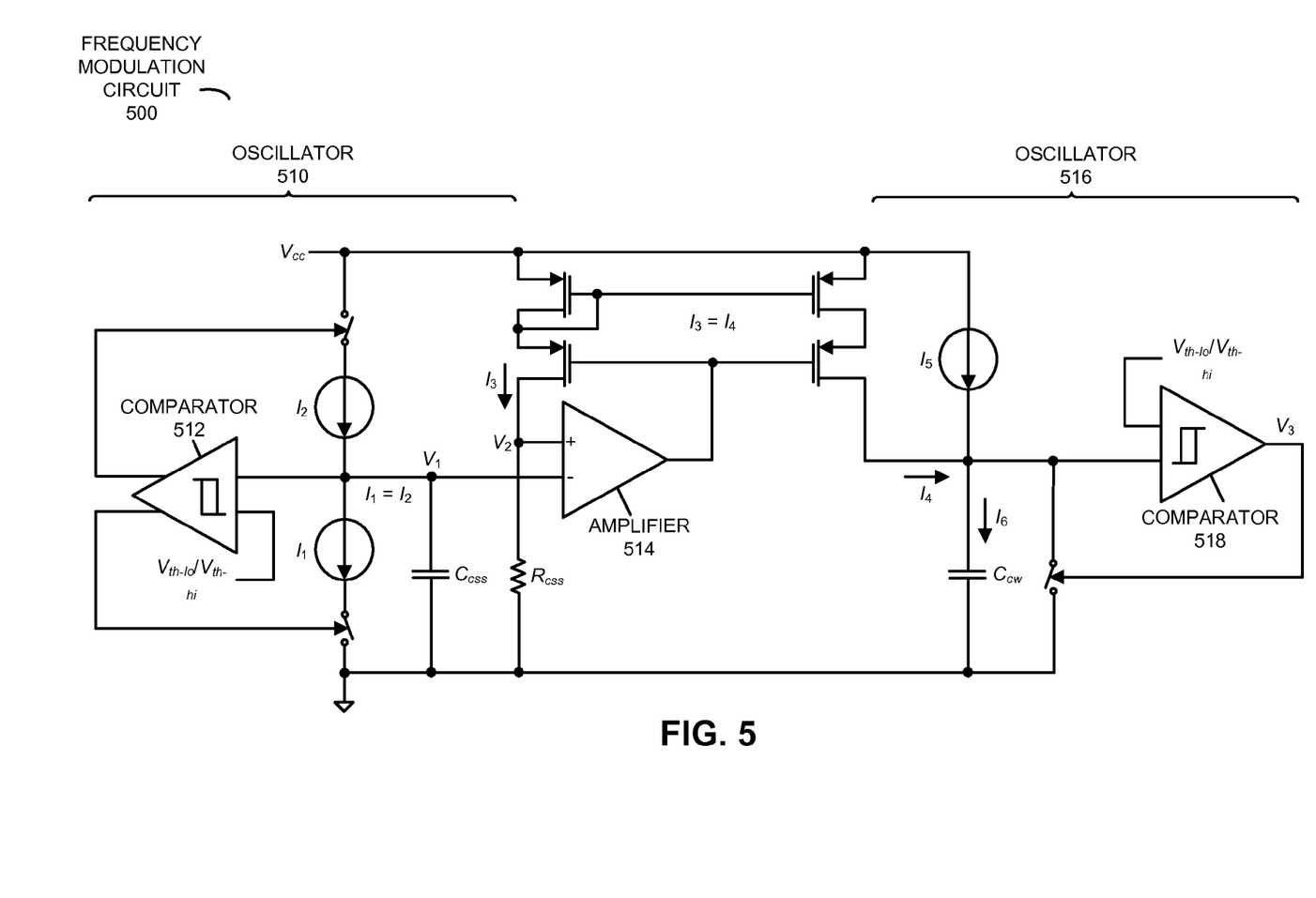
FIG. 5 is a block diagram illustrating a frequency modulation circuit in the switched-mode power supplies of FIGS. 1 and 2 in accordance with an embodiment of the present disclosure.

A frequency modulation circuit 500 that implements the continuous spread-spectrum modulation is shown in FIG. 5. This frequency modulation circuit may include an oscillator 510 that provides a current signal corresponding to the spread-spectrum modulation signal. In oscillator 510, switches may be alternately opened and closed to generate a triangle waveform. In particular, comparator 512 compares $V_1$ and two switchable thresholds to generate the triangle waveform on $V_1$ by charging/discharging capacitor $C_{CSS}$ with two equal precision current sources $I_1$ and $I_2$ (where $I_1$ equals $I_2$).

Moreover, amplifier 514 provides a gain stage that converts an output of oscillator 510 into a current signal corresponding to the spread-spectrum modulation signal. In particular, amplifier 514 forces $V_1$ and $V_2$ to be equal and thus $I_3$ is a triangle waveform following $V_1$, where $I_3$ equals $V_2/R_{CSS}$, which also equals $V_1/R_{CSS}$. Note that $I_4$ is a copy of $I_3$ (i.e., $I_4$ equals $I_3$), $I_5$ is fixed current source and $I_6$ equals $I_4$ plus $I_5$.

Furthermore, an oscillator 516 includes a comparator 518 that provides the modulated switching signal (and, in particular, a pulse-width-modulated switching signal) at $V_3$. In oscillator 516, comparator 518 is a triangle-waveform and a PWM clock generator. Note that, because the frequency of $V_3$ is proportional to $I_6$ and $I_4$ is changing in a triangular format, the frequency of $V_3$ is modulated with a triangular waveform as defined in $V_1$.

Figure 6:
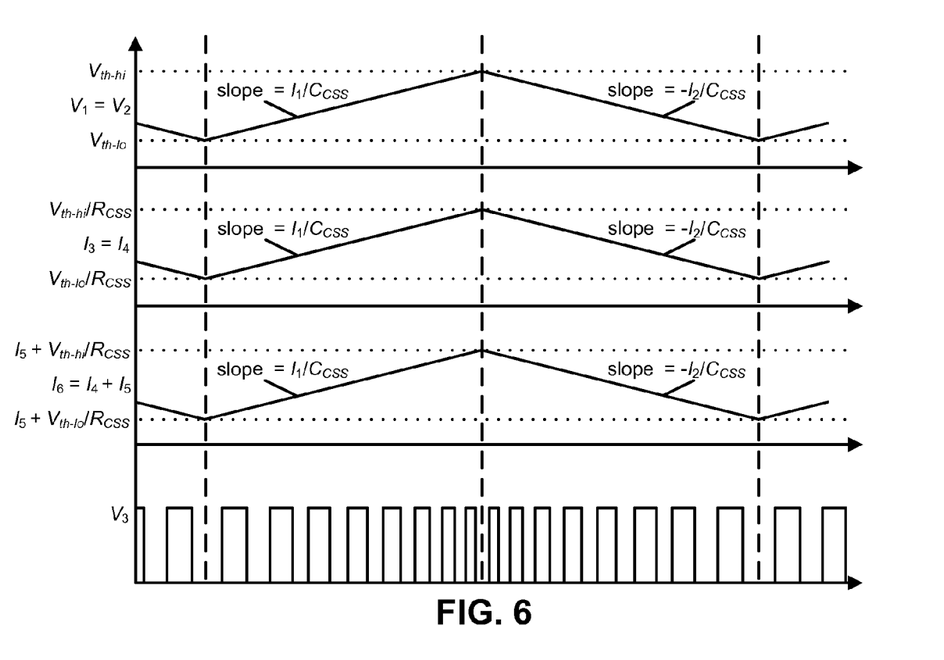
FIG. 6 is a timing diagram illustrating signals associated with the frequency modulation circuit of FIG. 5 in accordance with an embodiment of the present disclosure.

FIG. 6 presents a timing diagram illustrating signals associated with frequency modulation circuit 500 (FIG. 5). Note that $V_3$ is a PWM squarewave and its frequency is continuously varied in a triangular manner as defined in $I_6$.

Using frequency modulation circuit 500 (FIG. 5), a 10 dB reduction in switching noise can be achieved compared to a 4-step spread-spectrum modulation technique and an average of a 17 dB reduction compared to the switching noise without spread-spectrum modulation.

Figure 7:
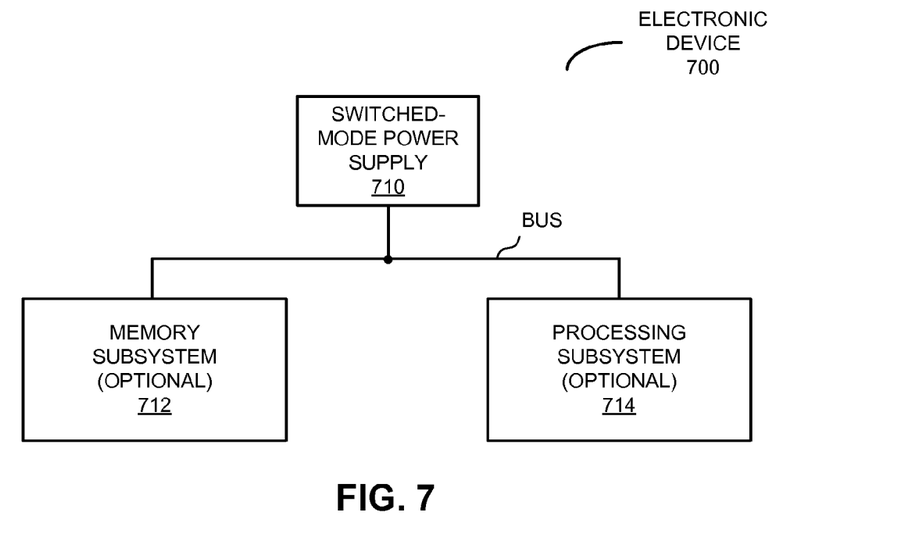
FIG. 7 is a block diagram illustrating an electronic device that includes a switched-mode power supply in accordance with an embodiment of the present disclosure.

An embodiment of the power supply may be used in an electronic device. This is shown in FIG. 7, which presents a block diagram illustrating an electronic device 700 that includes an embodiment of the switched-mode power supply, such as switched-mode power supply 710.

Figure 8:
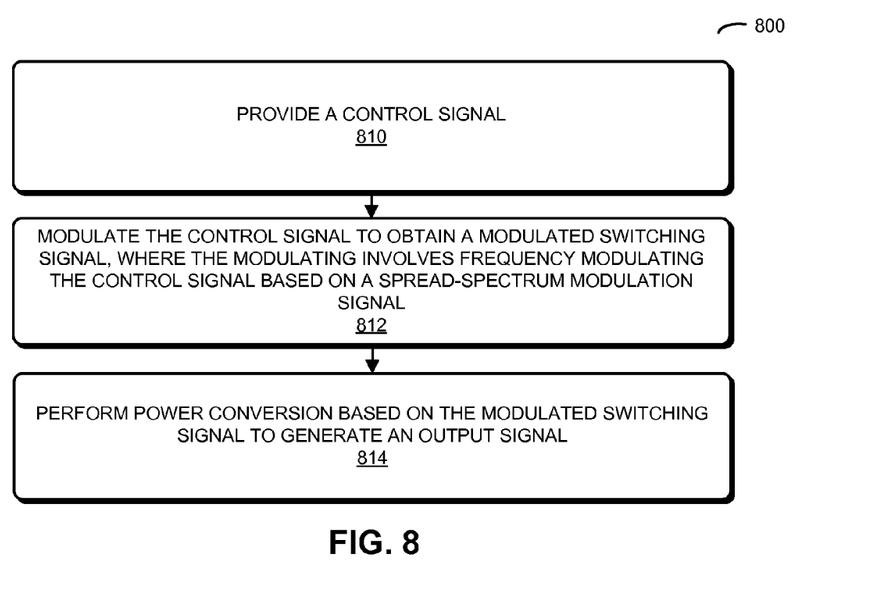
FIG. 8 is a flowchart illustrating a method for power conversion in accordance with an embodiment of the present disclosure.

We now describe embodiments of a method. FIG. 8 presents a flowchart illustrating a method 800 for power conversion, which may be performed by a switched-mode power supply (such as switched-mode power supply 100 in FIG. 1 or switched-mode power supply 200 in FIG. 2). During operation, a control circuit in the switched-mode power supply provides a control signal (operation 810). Then, a modulation circuit in the switched-mode power supply modulates the control signal to obtain a modulated switching signal, where the modulating involves frequency modulating the control signal over a bandwidth using a spread-spectrum modulation signal (operation 812) so that spectral content associated with the modulated switching signal is spread over the bandwidth in the spread-spectrum modulation signal. Next, a power-supply circuit in the switched-mode power supply performs power conversion based on the modulated switching signal to generate an output signal (operation 814).

In some embodiments of method 800, there may be additional or fewer operations. Moreover, the order of the operations may be changed, and/or two or more operations may be combined into a single operation.

Referring back to FIG. 7, while particular embodiments of the switched-mode power supply are used as an illustration in FIGS. 1 and 2, more generally the switched-mode power supply may be an arbitrary switched-mode power supply, including a switched-mode power supply having one or more stages and a different architecture or configuration than switched-mode power supplies 100 (FIG. 1) and 200 (FIG. 2). In an exemplary embodiment, the switched-mode power supply includes an isolated flyback converter and a non-isolated buck converter.

In general, functions of switched-mode power supplies 100 (FIG. 1) and 200 (FIG. 2) may be implemented in hardware and/or in software. Thus, electronic device 700 may include one or more program modules or sets of instructions stored in an optional memory subsystem 712 (such as DRAM or another type of volatile or non-volatile computer-readable memory), which may be executed by an optional processing subsystem 714. (In general, the synchronization technique may be implemented more in hardware and less in software, or less in hardware and more in software, as is known in the art.) Note that the one or more computer programs may constitute a computer-program mechanism. Furthermore, instructions in the various modules in optional memory subsystem 712 may be implemented in: a high-level procedural language, an object-oriented programming language, and/or in an assembly or machine language. Note that the programming language may be compiled or interpreted, e.g., configurable or configured, to be executed by the processing subsystem.

Components in switched-mode power supply 100 (FIG. 1), switched-mode power supply 200 (FIG. 2) and electronic device 700 may be coupled by signal lines, links or buses. While electrical communication has been used as an illustrative example, in general these connections may include electrical, optical, or electro-optical communication of signals and/or data. Furthermore, in the preceding embodiments, some components are shown directly connected to one another, while others are shown connected via intermediate components. In each instance the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Moreover, the circuits and components may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on a computer-readable medium. Those of skill in the art of integrated circuit fabrication can use such encoded data to fabricate integrated circuits comprising one or more of the circuits described herein.

Electronic device 700 may include one of a variety of devices that can include a power supply, including: a desktop computer, a server, a laptop computer, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device.

Although we use specific components to describe switched-mode power supply 100 (FIG. 1), switched-mode power supply 200 (FIG. 2) and electronic device 700, in alternative embodiments different components and/or subsystems may be used. Additionally, one or more of the components may not be present in FIGS. 1-7. In some embodiments, switched-mode power supply 100 (FIG. 1), switched-mode power supply 200 (FIG. 2) and electronic device 700 include one or more additional components that are not shown in FIGS. 1-7. For example, the power supply may be implemented in an integrated circuit. Also, although separate components are shown in FIGS. 1-7, in some embodiments some or all of a given component can be integrated into one or more of the other components and/or positions of components can be changed. Note that, while FIGS. 3 and 5 illustrate a particular modulation technique, the continuous spread-spectrum modulation may be implemented using a variety of modulation techniques.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A switched-mode power supply, comprising:
    a control circuit configured to provide a control signal;
    a modulation circuit, electrically coupled to the control circuit, configured to provide a modulated switching signal by frequency modulating the control signal over a bandwidth using a spread-spectrum modulation signal so that spectral content associated with the modulated switching signal is spread over the bandwidth in the spread-spectrum modulation signal; and
    a power-supply circuit, electrically coupled to the modulation circuit, configured to perform power conversion to generate an output signal based on the modulated switching signal,
    wherein the modulation circuit includes:
        a first oscillator;
        an amplifier configured to convert an output of the first oscillator into a current signal corresponding to the spread-spectrum modulation signal; and
        a second oscillator configured to provide the modulated switching signal.

2. The switched-mode power supply of claim 1, wherein the frequency modulation includes continuous frequency modulation over the bandwidth.

3. The switched-mode power supply of claim 1, wherein the spectral content is spread approximately evenly over the bandwidth.

4. The switched-mode power supply of claim 1, wherein the output signal is pulse-width modulated.

5. The switched-mode power supply of claim 1, wherein the spread-spectrum modulation signal includes a triangle waveform.

6. The switched-mode power supply of claim 1, wherein the modulation circuit is configured to reduce switching noise output by the switched-mode power supply.

7. An electronic device, comprising a switched-mode power supply, wherein the switched-mode power supply includes:
   a control circuit configured to provide a control signal;
   a modulation circuit, electrically coupled to the control circuit, configured to provide a modulated switching signal by frequency modulating the control signal over a bandwidth using a spread-spectrum modulation signal so that spectral content associated with the modulated switching signal is spread over the bandwidth in the spread-spectrum modulation signal; and
   a power-supply circuit, electrically coupled to the modulation circuit, configured to perform power conversion to generate an output signal based on the modulated switching signal,
   wherein the modulation circuit includes:
      a first oscillator;
      an amplifier configured to convert an output of the first oscillator into a current signal corresponding to the spread-spectrum modulation signal; and
      a second oscillator configured to provide the modulated switching signal.

8. The electronic device of claim 7, wherein the frequency modulation includes continuous frequency modulation over the bandwidth.

9. The electronic device of claim 7, wherein the spectral content is spread approximately evenly over the bandwidth.

10. The electronic device of claim 7, wherein the output signal is pulse-width modulated.

11. The electronic device of claim 7, wherein the spread-spectrum modulation signal includes a triangle waveform.

12. The electronic device of claim 7, wherein the modulation circuit is configured to reduce switching noise output by the switched-mode power supply.

13. A method for power conversion, comprising:
   providing a control signal using a control circuit;
   modulating the control signal to obtain a modulated switching signal using a modulation circuit, wherein the modulating involves frequency modulating the control signal over a bandwidth using a spread-spectrum modulation signal so that spectral content associated with the modulated switching signal is spread over the bandwidth in the spread-spectrum modulation signal; and
   using a power-supply circuit, performing power conversion based on the modulated switching signal to generate an output signal,
   wherein the modulation circuit includes:
      a first oscillator;
      an amplifier configured to convert an output of the first oscillator into a current signal corresponding to the spread-spectrum modulation signal; and
      a second oscillator configured to provide the modulated switching signal.

14. The method of claim 13, wherein the frequency modulation includes continuous frequency modulation over the bandwidth.

15. The method of claim 13, wherein the spectral content is spread approximately evenly over the bandwidth.

16. The method of claim 13, wherein the output signal is pulse-width modulated.

17. The method of claim 13, wherein the spread-spectrum modulation signal includes a triangle waveform.

18. The method of claim 13, wherein the modulation circuit is configured to reduce switching noise output by the power-supply circuit.

* * * * *